United States Patent [19]

Trujillo et al.

[11] Patent Number: 4,861,364

[45] Date of Patent: Aug. 29, 1989

[54] METHOD FOR USING STAINED GLASS REVOLVING WORK STATION WITH REMOVABLE WORK SURFACE

[76] Inventors: Ted A. Trujillo; Suzanne S. Trujillo, both of 1715 W. Flamingo, #66, Nampa, Id. 83651

[21] Appl. No.: 271,413

[22] Filed: Nov. 14, 1988

Related U.S. Application Data

[63] Continuation of Ser. No. 897,073, Aug. 18, 1986, abandoned.

[51] Int. Cl.$^4$ .............................................. C03B 23/20

[52] U.S. Cl. .......................................... 65/36; 24/442; 24/447; 65/43; 65/56; 65/58; 65/156; 269/57; 269/304

[58] Field of Search .................... 65/17, 36, 43, 44, 56, 65/57, 58, 156, 357, 360; 269/57, 303, 304, 309, 900; 24/442, 447

[56] References Cited

U.S. PATENT DOCUMENTS

| | | | |
|---|---|---|---|
| 257,526 | 5/1882 | Stanley | 65/43 X |
| 274,948 | 4/1883 | Farge | 65/43 X |
| 519,186 | 5/1894 | Hughs | 65/36 X |
| 713,710 | 11/1902 | Stein et al. | 65/43 |
| 718,894 | 1/1903 | Alke et al. | 65/43 X |
| 914,734 | 3/1909 | Kyle | 65/36 X |
| 3,703,739 | 11/1972 | Young et al. | 24/442 X |
| 4,056,136 | 11/1977 | Miller | 144/134 D X |
| 4,327,786 | 5/1982 | Markkula | 269/303 X |

*Primary Examiner*—Robert L. Lindsay
*Attorney, Agent, or Firm*—Frank J. Dykas

[57] ABSTRACT

A method for assembling and soldering pieces of stained glass involves placing a template to outline a mosaic fit of glass pieces on a workboard by nailing flat sided nails to the outer perimeter of the glassware as defined by the template in which glass pieces are cut and wrapped with copper foil positioned on the template with attaching the support assembly to a rotatable workboard which is positioned to solder the glassware together in which the template is subsequently removed and the glassware turned and rotated on the workboard and the glassware is soldered together.

1 Claim, 1 Drawing Sheet

METHOD FOR USING STAINED GLASS REVOLVING WORK STATION WITH REMOVABLE WORK SURFACE

This is a continuation of application Ser. No. 897,073, filed on Aug. 18, 1986, now abandoned.

BACKGROUND OF THE INVENTION

1. Field of Invention

This invention relates to an apparatus and a method using said apparatus for assembling and soldering glassware, in a particular stained glass piece.

2. Description of the Prior Art

The use of stained glass component parts for assembling glassware ornaments, artwork, or stained glass windows has been well known for centuries. The basic process or method for assembling stained glass pieces has remained unchanged for a number of years. In general terms, the process involves drawing an actual size template which is laid out on a flat worksurface. Pieces of variously colored stained glass are then cut and ground to size as shown on the template and then positioned on the template at the appropriate location thus assuring the person assembling the stained glassware that all of the component pieces have been cut and fit properly together.

In the traditional method of making a stained glass piece, the assembler then removes all of the component pieces from the worksurface, removes the template and then wraps the edges of each individual component piece of glass with copper foil. The individual component pieces are then again laid out on the worksurface to form the stained glassware.

Once this has been done flat sided nails are positioned in close spaced relationship to each other around the outer perimeter of the assembled stained glassware to hold all of the component pieces together during the soldering phase. The assembler then uses a soldering iron to inject melted solder into the joints of the various component pieces. The solder, when it has cooled and resolidified, holds the entire stained glassware together.

The nails are then removed, and the stained glassware is carefully turned over so that the opposite side can also be soldered. After the completion of soldering, the outside perimeter is finished either by framing or with the appropriate soldered trim.

The art of assembling stained glasswares either for small windows and/or for ornaments has always attracted the home hobbyist and has enjoyed increased popularity over the past several years. The problem is that the cutting and polishing operations involve grinding wheels and cutting and breaking of pieces of glass. These operations generate a lot of dust and small splinters of glass, and as a result, are normally done in a garage or workshop. The soldering operation requires a clean, well lighted and comfortable environment with a very steady worksurface since it requires steady hands and skill. In the case of the hobbyist, this soldering operation is done inside the home, usually at a well lighted table.

Soldering the various component parts together into one glassware is a slow, careful operation requiring steady hands and patience. If the final glassware being assembled is of any significant size it becomes difficult to reach one end of the glassware from the other if the solderer has to reach over the glassware to apply solder to the far end. Most hobbyists use a workboard which is placed upon a table. They rest their hands, wrists or arms on the workboard to steady them and from time to time have to stop soldering to pick up the workboard to reposition it so as to have better access to other sections of the piece being assembled. This is tedious and time consuming.

Additionally, hobbyists often times assemble two or more individual items of glassware at the same time. In this manner all of the pieces for two separate works will be cut and polished at the same time. And then, when the hobbyist is ready to solder the component pieces, he will do the soldering operations for all of the pieces at the same time. Thus while one semi-finished piece is cooling, the hobbyist may be soldering together the component parts of a second piece.

Various workfixtures have been developed for holding glass while it is being cut, ground or polished. In particular, U.S. Pat. No. 4,327,786 discloses such a workfixture in which a workpiece, as it is being acted upon by cutting or finishing tools, can be held in place or slid either in a straight line or rotated about a fixed axis. U.S. Pat. No. 4,056,136 discloses an apparatus for pivotally supporting cutting and polishing tools by use of a maulstick while the piece being worked upon is held by peripheral clamps.

However none of the prior art provides a fixture suitable for use in assembling stained glass artwork where, after the cut component parts are placed upon the template, they need not be removed again until a first soldering operation has been completed even though the cutting, grinding and polishing operations take place at a different location from that at which the soldering is done.

SUMMARY OF THE INVENTION

Accordingly, it is an object of this invention to provide an apparatus whereby the assembler can position the template on a workboard, then position the flat sided nails around the outer perimeter of the unfinished piece as shown on the template and then take the workboard to a remote workstation where the cutting, grinding and polishing operations will be done. The operator can then locate the workboard at a place convenient for him to cut, grind, polish and then check the finished component parts for fit as shown on the template.

A second object to this invention is to then allow the assembler to move the workboard, with the component parts in place on the template, to another location for soldering.

A third object of the invention is to provide a means of rotating the workboard, while at the same time holding it in a horizontal plane without vertical wobble, so as to enable the assembler to easily rotate the workboard to facilitate easy access to the entire workpiece for soldering purposes.

The fourth object of this invention is to provide a means for attaching various workboards to the rotational section to facilitate in the assembling or soldering of multiple pieces at the same time.

These objects are achieved through an assembly which has one or more workboards which attach by means of flexible, mutually facing, strips of fabric formed so that the exposed surfaces therefore provide a dense multitude of projecting tiny severed hook and latch shaped filaments so that when two similar facing surfaces are pressed together they interlock to provide a firm but easily releasable closure. Said materials of this type are commercially available in various forms under the proprietary name "VELCRO". Various forms of such flexible facing materials and techniques of producing the same are disclosed in U.S. Pat. Nos. 2,717,437; 3,009,235; 3,083,737; 3,114,951; 3,136,026; 3,147,528; 3,154,837 and 3,703,739. These strips are attached to a support plate which is attached to a base by means of a thrust bearing of sufficient diameter to rotatably hold the support plate and the workboard in a horizontal plane without any vertical wobble.

DESCRIPTION OF THE PREFERRED EMBODIMENT

Figure 1:
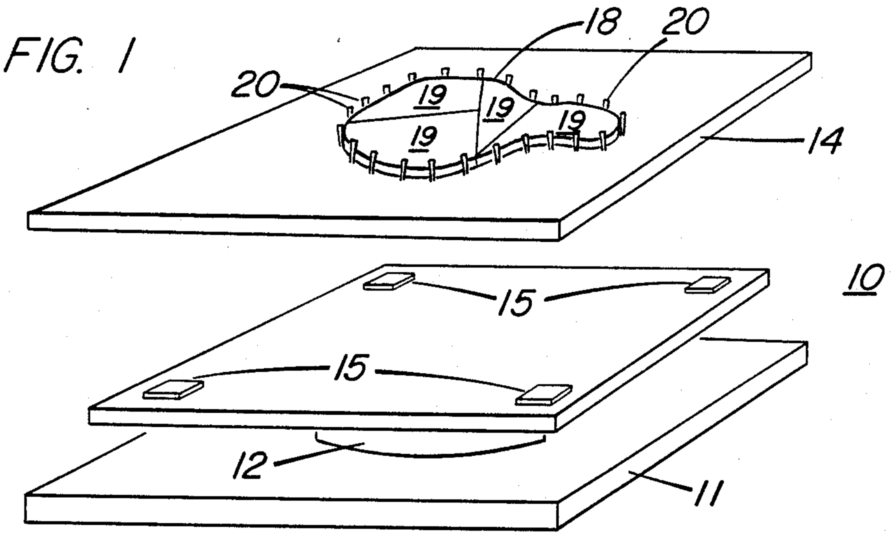
FIG. 1 is a perspective view of the apparatus showing a detached square workboard.

First referring to FIG. 1, the apparatus for assembly of stained glassware 10 is shown in perspective view with square workboard 14 detached. Support plate 13 is attached to thrust bearing 12 and supported by base 11. Flexible hook and latch material strips 15 are positioned on support plate 13 for alignment with matching flexible hook and latch material strips located on the bottom side, not shown, of square workboard 14.

Figure 2:
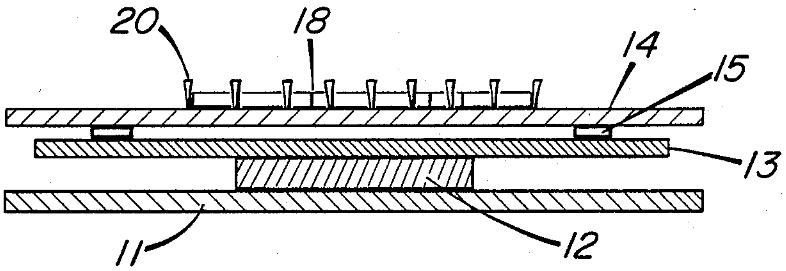
FIG. 2 is a side view of the apparatus showing the workboard attached.

FIG. 2 is a side view showing workboard 14 attached by means of flexible hook and latch material strips 15 to support plate 13. The thrust bearing 12 is of sufficient diameter so as to prevent wobble of workboard 14 when weight is applied intermittently by the person soldering the component pieces 19 together to form the glassware generally identified as 18.

Figure 3:
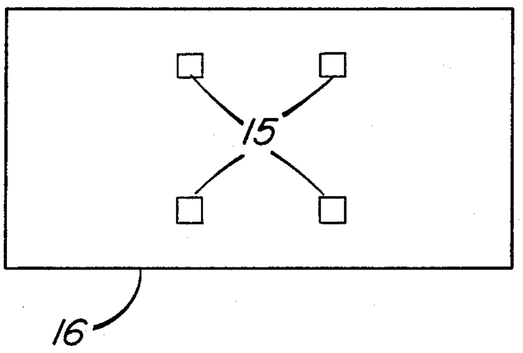
FIG. 3 is a bottom view of a rectangular workboard.
Figure 4:
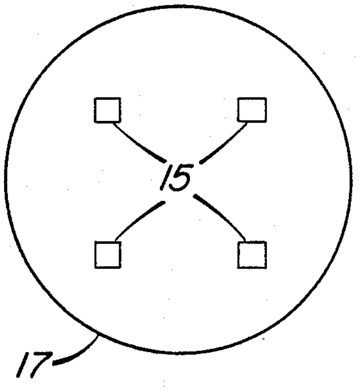
FIG. 4 is a bottom view of a circular workboard.

Flat sided nails 20 are used to hold the component pieces 19 in place on workboard 14 until the soldering of the top surface of glassware 18 has been completed. As a result, square workboard 14 and any other configuration such as those shown in FIGS. 3 and 4, must be made of material having ligneous properties. In practice it has been found that particleboard has suitable characteristics and properties for use as a workboard since it allows nailing flat sided nails 20 with relative ease. And, after said nails have been removed the residual holes tend to shrink in size as the resilient fibers of the particleboard expand back to their original shape and size. FIGS. 3 and 4 disclose different shapes and sizes for workboards, with FIG. 3 disclosing a rectangular workboard 16 and FIG. 4 a circular workboard 17. In both cases flexible hook and latch material strips 15 are located on the bottom side of the workboards in position where they will align with the matching flexible hook and latch material strips 15 on common support plate 13. In this manner the same support assembly 10 can be used for multiple workboards of various shapes and sizes.

While there is shown and described the present preferred embodiment of the invention, it is to be distinctly understood that the invention is not limited thereto but may be variously embodied to practice within the scope of the following claims. Accordingly,

We claim:

1. A method for assembling glassware which comprises:

placing a template which outlines the mosaic fit of the component glass pieces which comprises the glassware on a workboard; and nailing to the workboard flat-sided nails around the outer perimeter of the glassware to be assembled as it is defined by the template; and cutting the component glass pieces to the size and shape defined by the template; and wrapping copper foil around the edges of the component glass pieces; and positioning the component glasswares on the template; and attaching the workboard to a rotatable support assembly; and rotating the workboard to suitably position the component glasswares for soldering; and soldering the glasswares together; and removing the flat sided nails from the perimeter of the glassware; and removing the template from the workboard; and turning over the glassware on the workboard; and rotating the workboard to again suitably position the glass component pieces for soldering; and soldering the exposed surface of the glasswares together.

* * * * *